United States Patent [19]
Yoo

[11] Patent Number: 5,924,182
[45] Date of Patent: Jul. 20, 1999

[54] APPARATUS FOR ASSEMBLING BEARING AND STATIONARY DRUM

[75] Inventor: Dae-Sun Yoo, Seoul, Rep. of Korea

[73] Assignee: Daewoo Electronics Co., Ltd., Rep. of Korea

[21] Appl. No.: 08/976,569

[22] Filed: Nov. 24, 1997

[30] Foreign Application Priority Data

Dec. 30, 1996 [KR] Rep. of Korea ........................ 96-78334

[51] Int. Cl.[6] .............................. B23P 19/02; B23D 5/02; B23D 37/16
[52] U.S. Cl. ............................ 29/33 K; 29/251; 409/260; 409/307
[58] Field of Search .................................. 29/33 R, 33 K, 29/263, 251, 257, 560; 409/289, 307, 259, 260, 261

[56] References Cited

U.S. PATENT DOCUMENTS

| | | | |
|---|---|---|---|
| 2,534,759 | 12/1950 | Ducci | 409/305 |
| 3,862,483 | 1/1975 | Kloster | 29/263 X |
| 4,138,927 | 2/1979 | Hamil | 360/107 |
| 4,251,840 | 2/1981 | Maruyama et al. | 409/289 |
| 4,761,100 | 8/1988 | Maillard | 29/560 X |

Primary Examiner—William Briggs
Attorney, Agent, or Firm—Pennie & Edmonds LLP

[57] ABSTRACT

A head drum assembly for use in a video cassette recorder includes a stationary drum, a rotary shaft rotatably fitted into the stationary drum, a rotary drum closely fitted onto the rotary shaft, a lower bearing fitted into a lower portion of the stationary drum and an upper bearing fitted into an upper portion of the stationary drum. Herein, the upper bearing includes a top surface facing the rotary drum and an inner peripheral surface, facing the rotary shaft. The top surface is provided with a plurality of building-up grooves for retaining an oil for lubricating the upper bearing and the inner peripheral surface is provided with an oil guiding groove for guiding the oil retained on the inner peripheral surface onto the building-up groove of the top surface during rotation of the rotary shaft.

9 Claims, 7 Drawing Sheets

5,924,182

APPARATUS FOR ASSEMBLING BEARING AND STATIONARY DRUM

FIELD OF THE INVENTION

The present invention relates to a head drum assembly for use in a video cassette recorder; and more particularly, to a bearing to be incorporated into a stationary drum of the head drum assembly, the bearing having an oil guiding groove on an inner peripheral surface thereof.

BACKGROUND OF THE INVENTION

There is shown in FIG. 1 a vertical cross sectional view of a conventional head drum assembly for use in a video cassette recorder.

The head drum assembly includes a stationary drum 101, a rotary shaft 102 rotatably fitted into the stationary drum 101, a rotary drum 103 closely fitted onto a top part of the rotary shaft 102 above the stationary drum 101, a motor 104 disposed under the stationary drum 101, for rotating the rotary shaft 102, and an upper and a lower bearings 105,106 fitted into the stationary drum 101, for rotatably supporting the rotary shaft 102 and the rotary drum 103 relative to the stationary drum 101. The bearings 105,106 are of an self-lubricated type, containing an oil lubricant impregnated during the manufacture thereof. An inner peripheral surface of the upper bearing 105 facing the rotary shaft 102 functions a radial bearing surface and a top surface thereof facing the rotary drum 103 functions a thrust bearing surface. When the rotary shaft 102 rotates, the impregnated oil tends to seep out, retained in a building-up groove formed on the thrust bearing surface and form an oil film between the bearing surfaces and surfaces of the rotary shaft 102 and the rotary drum 103 facing the bearing surfaces, to reduce the friction therebetween.

When the rotary drum rotates, however, part of the oil retained in the building-up groove may fly off as a result of rotation of the rotary drum, thereby preventing a sufficient amount of the oil to be retained in the building-up groove thereof for forming the oil film, preventing the rotary drum to rotate smoothly.

SUMMARY OF THE INVENTION

It is, therefore, a primary object of the invention to provide a bearing to be incorporated into a stationary drum of a head drum assembly for use in a video cassette recorder, the bearing having an oil guiding groove on its inner peripheral surface thereof, the oil guiding groove being used for guiding the oil to the building-up groove on the top surface thereof.

It is another object of the invention to provide an simple and effective apparatus capable of forming an oil guiding groove on a bearing and fitting the same into the stationary drum.

In accordance with one aspect of the present invention, there is provided a head drum assembly for use in a video cassette recorder, comprising a stationary drum, a rotary shaft rotatably fitted into the stationary drum, a rotary drum closely fitted onto the rotary shaft, a lower bearing fitted into a lower portion of the stationary drum and an upper bearing fitted into an upper portion of the stationary drum, characterized in that: the upper bearing includes a top surface facing the rotary drum and an inner peripheral surface facing the rotary shaft, the top surface being provided with a plurality of building-up grooves for retaining an oil, the inner peripheral surface being provided with an oil guiding groove for guiding the oil retained on the inner peripheral surface onto the building-up groove of the top surface during rotation of the rotary shaft.

In accordance with another aspect of the present invention, there is provided an apparatus for forming an helical-shaped groove on a bearing in a head drum assembly and fitting the same into a stationary drum of the head drum assembly, the apparatus comprising: a base die having a through hole on which the stationary drum and the bearing are mounted; pressing means for pressing the bearing, so as to fit the bearing into the stationary drum; groove-forming means for forming the helical-shaped groove on an inner peripheral surface of the bearing, the groove-forming means including (a) a groove-forming element having a cutting member for cutting the helical-shaped groove; and (b) an aligning bar extending from one end of the groove-forming element and movably fitted into the through hole of the base die, the bar being used to rotate and vertically move the groove-forming element simultaneously, the aligning bar passing through the stationary drum and the bearing mounted on the base die in turn so that the stationary drum and the bearing are aligned; and means for protecting the groove-forming element protruded above the bearing, while the pressing element presses the bearing.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
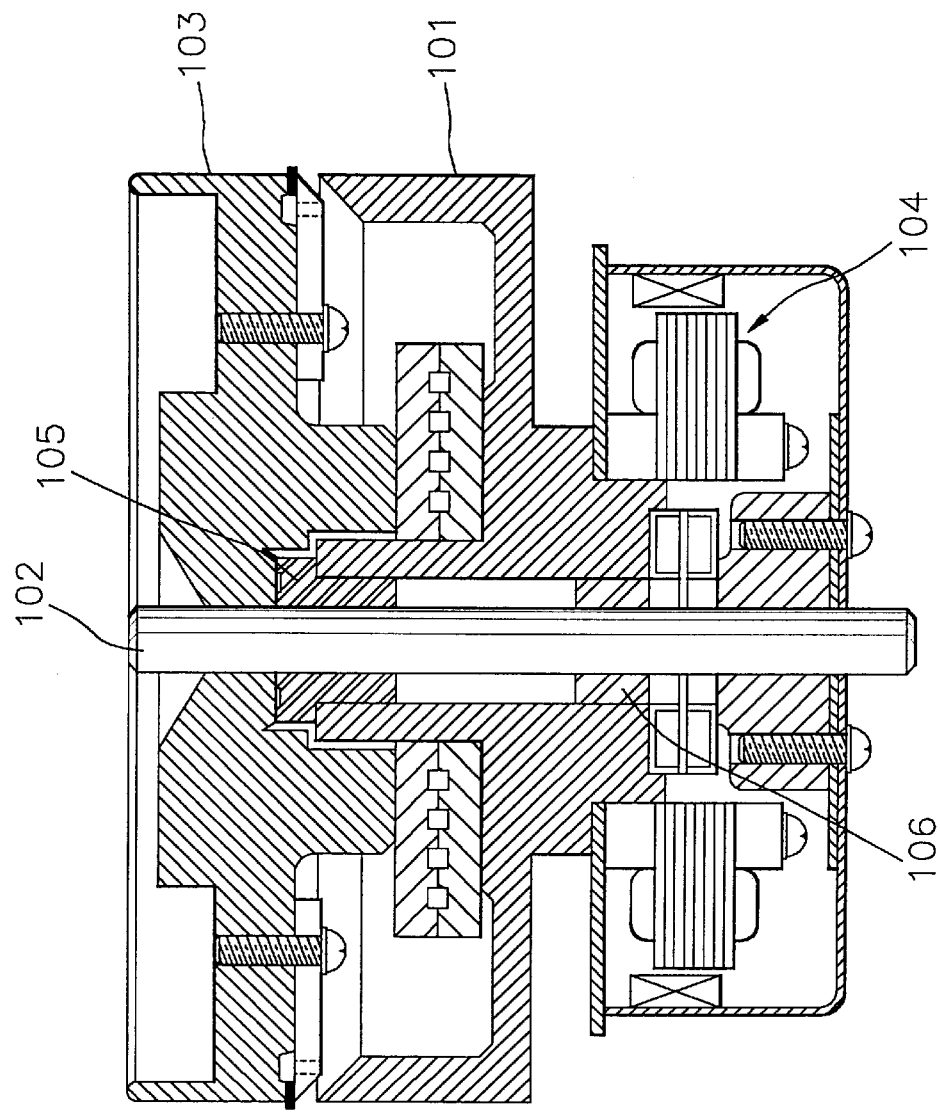
FIG. 1 shows a vertical cross sectional view of a conventional head drum assembly.
Figure 2:
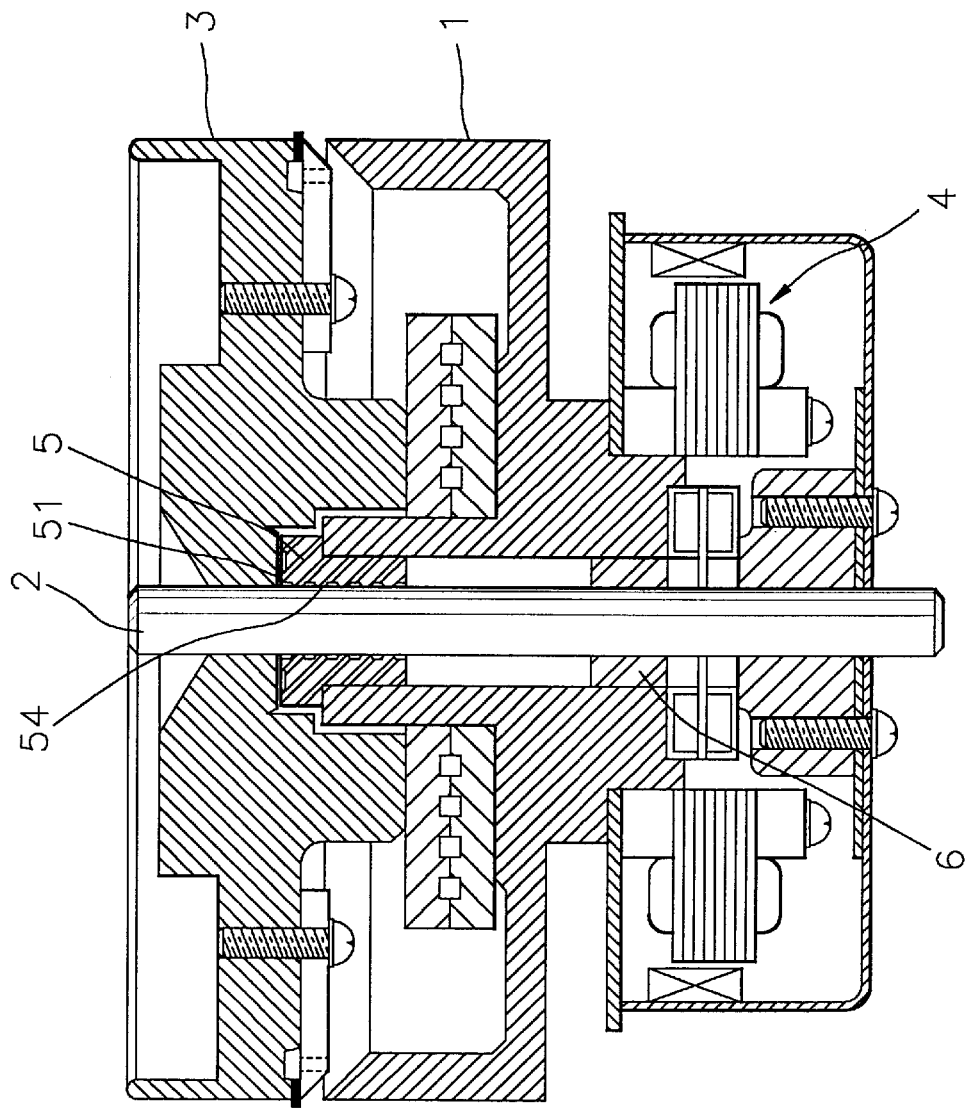
FIG. 2 shows a vertical cross sectional view of a head drum assembly in accordance with one aspect of the present invention.

There is shown in FIG. 2 a vertical cross sectional view of a head drum assembly in accordance with one aspect of the present invention.

The head drum assembly includes a stationary drum 1, a rotary shaft 2 rotatably fitted into the stationary drum 1, a rotary drum 3 closely fitted onto a top part of the rotary shaft 2 above the stationary drum 1, a motor 4 disposed under the stationary drum 1 for rotating the rotary shaft 2, and an upper and a lower bearings 5,6, fitted into the stationary drum 1, for rotatably supporting the rotary shaft 2 and the rotary drum 3 relative to the stationary drum 1.

The bearings 5,6 are of a self-lubricated type, containing an oil lubricant impregnated during the manufacture thereof. The upper bearing 5 has a top surface 51 facing the rotary drum 3 and an inner peripheral surface 54 facing the rotary shaft 2. The top surface 51 functions as a thrust bearing surface and the inner peripheral surface 54 functions as a radial bearing surface, allowing the upper bearing 5 to support a radial and a thrust load of the rotary drum 3 simultaneously.

Figure 3:
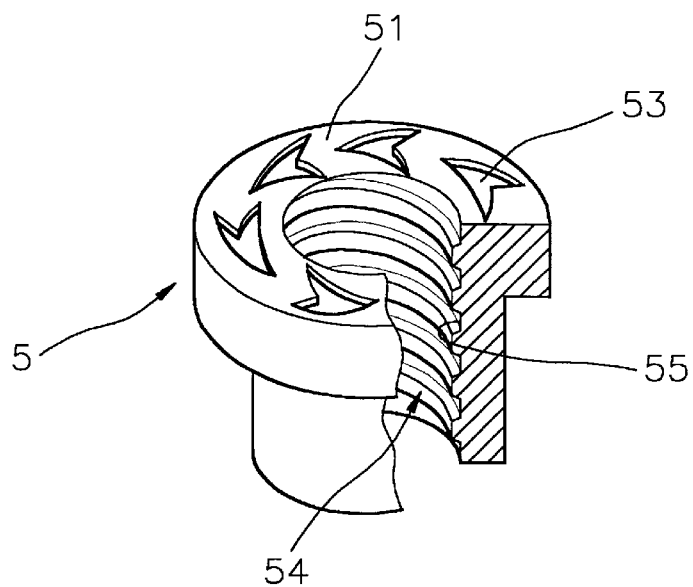
FIG. 3 illustrates a perspective view of an upper bearing (with portions broken away) of a head drum assembly shown in FIG. 2.

Referring to FIG. 3, the top surface 51 of the upper bearing 5 has a plurality of building-up groove 53 spaced in a circumferential direction. The building-up groove 53 retains the oil seeping out onto the top surface 51, the oil being used to reduce the hydrodynamic friction between the upper bearing 5 and the rotary drum 3 during rotation of the rotary drum 3.

The inner peripheral surface 54 of the upper bearing 5 has an oil guiding groove 55 of a helical shape of rising in a steady curve to a rotating direction of the rotary shaft 2. It is preferable that the oil guiding groove 55 has a depth ranging from 5 $\mu$m to 10 $\mu$m, and a pitch ranging from 0.05 mm to 1 mm. The oil guiding groove 55, retaining the oil seeping out on the inner peripheral surface 54, the oil used to reduce the hydrodynamic friction between the upper bearing 5 and the rotary shaft 3, guides the retained oil onto the top surface 51.

Figure 4:
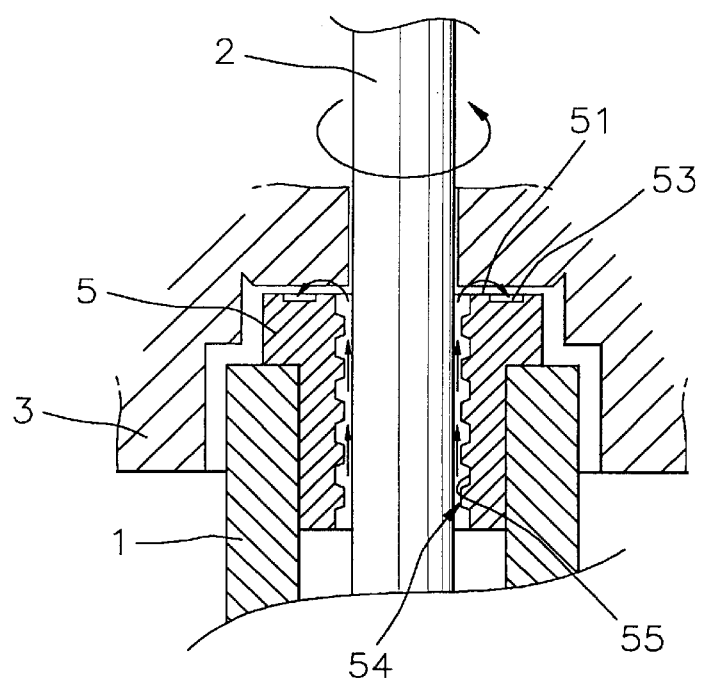
FIG. 4 is a enlarged cross sectional view of the head drum assembly shown in FIG. 2, illustrating an oil flow therein.

Referring to FIG. 4, when the rotary drum 3 and the rotary shaft 2 rotates, the impregnated oil seeps out and forms an oil film between the upper bearing 5 and the rotary shaft 2 and between the upper bearing 5 and the rotary drum 3. At this time, part of the oil retained in the building-up groove 53 may fly off as a result of rotation of the rotary drum 3. On the other hand, the oil retained in the oil guiding groove 55 is guided along the oil guiding groove 55 and flows up in the direction indicated by an arrow in the drawing, to be introduced into the building-up groove 53.

Figure 5:
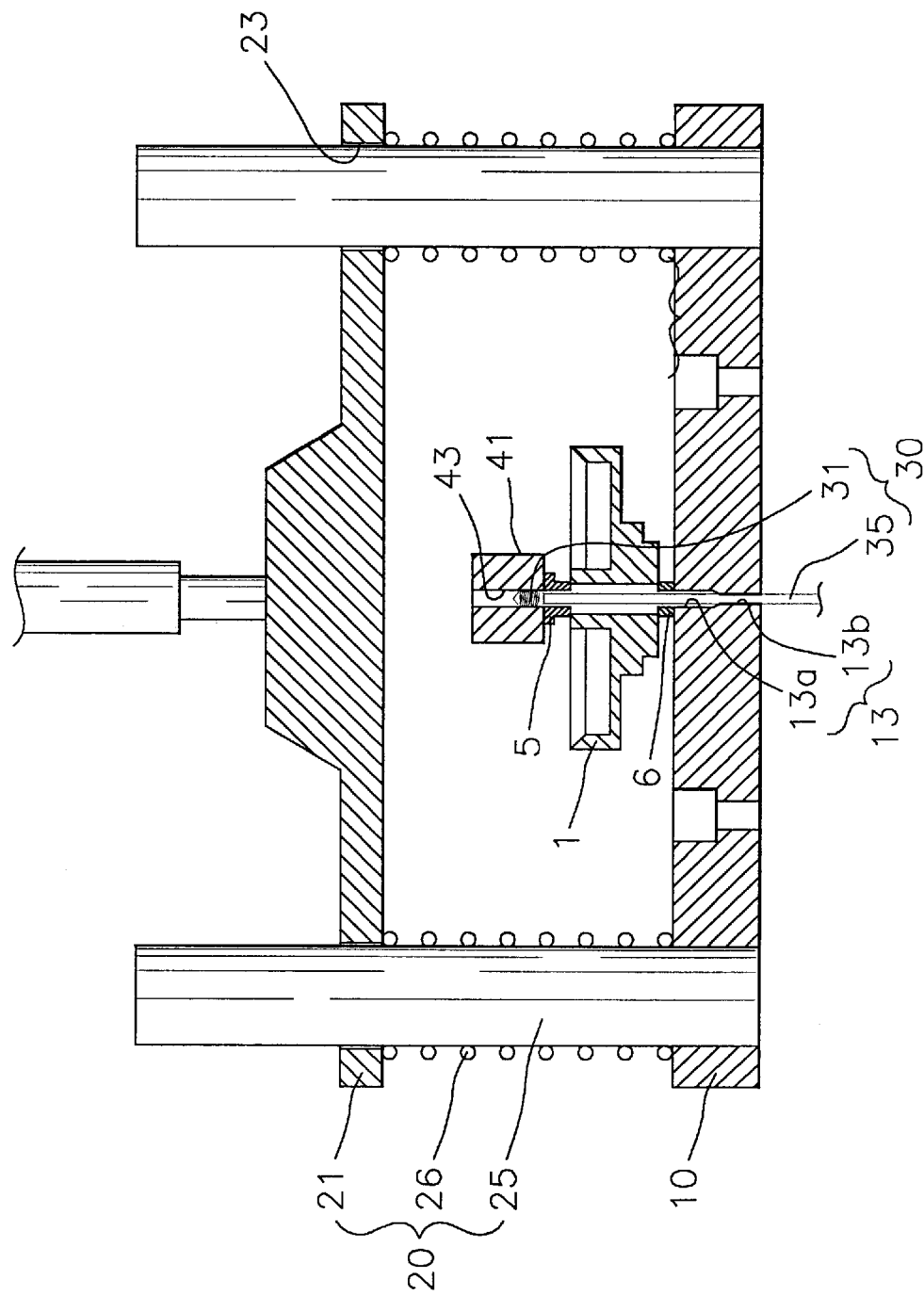
FIG. 5 represents a vertical cross sectional view setting forth an apparatus in accordance with another aspect of the prevent invention.
Figure 6:
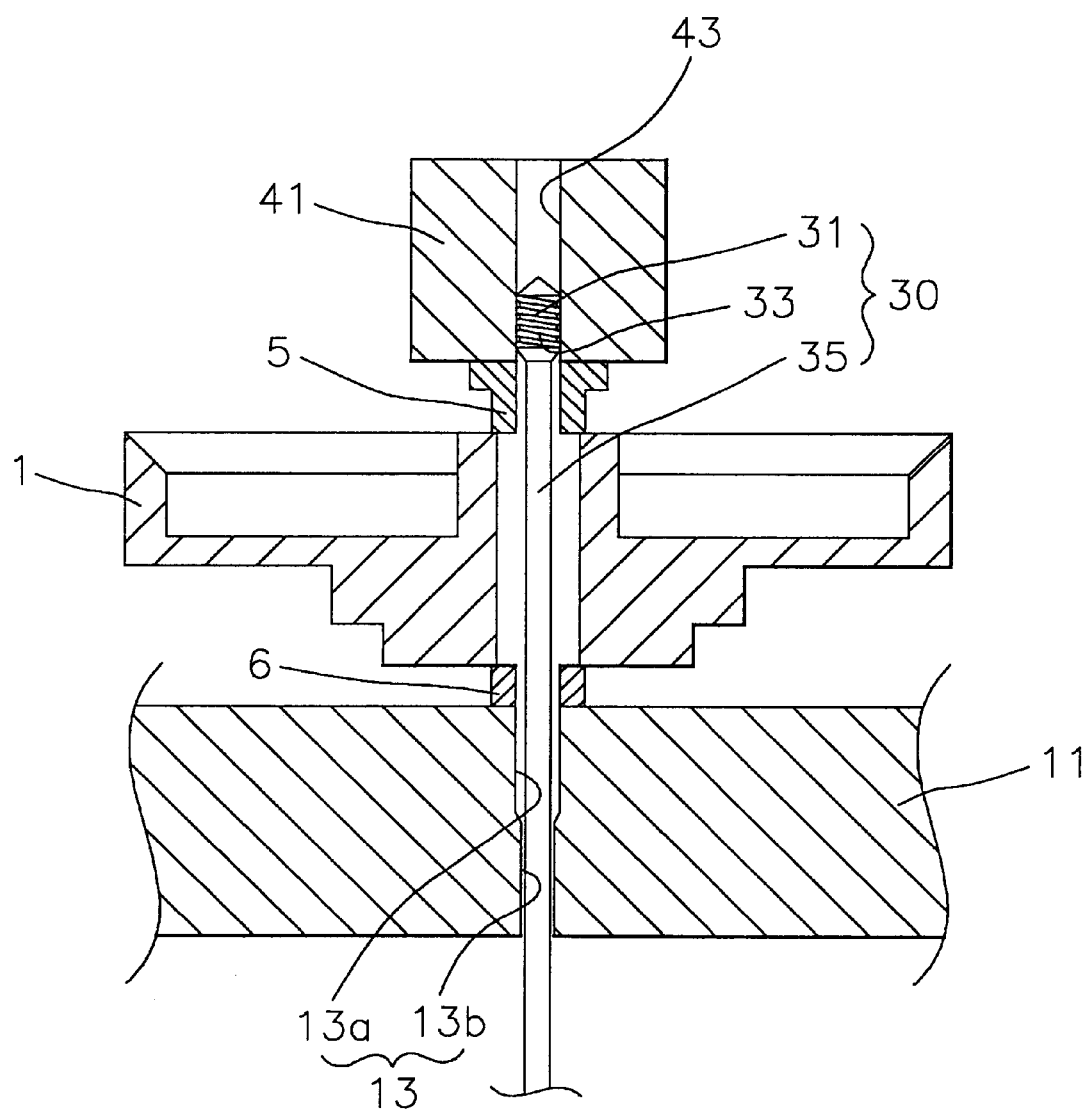
FIG. 6 presents a partially expanded cross sectional view of the workpiece and the groove-forming element shown in FIG. 5.

There are shown in FIG. 5 and 6 setting forth an apparatus in accordance with another aspect of the present invention. The apparatus includes a base die 10 on which workpiece is mounted, a presser 20 for pressing the workpiece, a groove forming device 30 for forming a helical-shaped groove, and protecting member 41 for protecting the groove forming device 30. The workpiece is comprised of a stationary drum 1 and an upper and a lower bearings 5,6. However, in a case when only one bearing is required to be grooved, the workpiece may be comprised of a stationary 1 and an upper bearing 5 or a lower bearing 6. For the sake of simplicity, the following description of the workpiece is for the workpiece comprising of a stationary drum 1 and an upper bearing 5.

The base die 10 has a top surface for mounting the workpiece and a through hole 13, which defines the moving path of the groove forming device 30, in a center part thereof.

The presser 20 includes a plurality of a circular-shaped columns 25 vertically fixed to the base die 10 and a pressing element 21 engaged with the columns 25 through its bores 23 in such a way that it moves up and down along the columns 25. The columns 25 serve to guide the movement of the pressing element 21. Further, disposed around the columns 25 between the base 10 die and the pressing element 21, are resilient means, e.g., a plurality of springs 26, serving to restore the pressing element 21 to its original position after the pressing operation of the presser 20 is completed.

On the other hand, the groove forming device 30 includes a groove-forming element 31 and an aligning bar 35 for driving the groove-forming element 31 as well as aligning the workpiece.

The groove-forming element 31 has a circular shape and provided with a cutting member, i.e., a cutting groove 33 formed on a peripheral surface thereof, the cutting groove 33 having a helical shape, e.g., a shape matched against the oil guiding groove 55 described above. The groove-forming element 31 has a slightly smaller diameter before the bearing 5 is fitted onto the stationary drum 1, but a slightly larger diameter after being fitted, than a inner diameter of the bearing 5. Preferably, the diameter of the groove-forming element 31 is larger than that of the aligning bar 35 by $\frac{1}{1000}$ to $\frac{1}{500}$ of the diameter of the aligning bar 35.

The aligning bar 35 extending from the groove-forming element 31 is fitted into the through hole 13 of the base die 10, in such a way that it allows the groove-forming element 31 to be rotated and vertically moved by a driving means (not shown), simultaneously. The aligning bar 35 has a smaller diameter than a inner diameter of the bearing 5 even after the bearing 5 is fitted onto the stationary drum 1, passing through the workpiece mounted on the base die 10, to allow the workpiece to be aligned.

The through hole 13 of the base die 10 has an upper part 13a and a lower part 13b. The upper part 13a has a slightly larger diameter than that of the groove-forming element 31, allowing the groove-forming element 31 to be housed, after the groove-forming operation of the groove-forming element 31 is completed. The lower part 13b has a slightly larger diameter than that of the aligning bar 35, allowing the aligning bar 35 to move.

Since the groove-forming element 31 is located above the upper bearing 5 during operation of the pressing element 21, the groove-forming element 31 may need to be protected from coming into contact with the pressing element 21. The protecting member, in the preferred embodiment, is formed as a rigid block 41 of a cylindric shape having a receiving hole 43 at the center part thereof, but it may be embodied by forming the receiving hole 43 at the opposite part of the pressing element 21, a receiving hole 43 being used for receiving the groove-forming element 31. The rigid block 41 plays an additional role of concentrating the pressure of the pressing element 21 to the bearing 5.

The operating principles of the inventive apparatus will now be described in detail.

Figure 7:
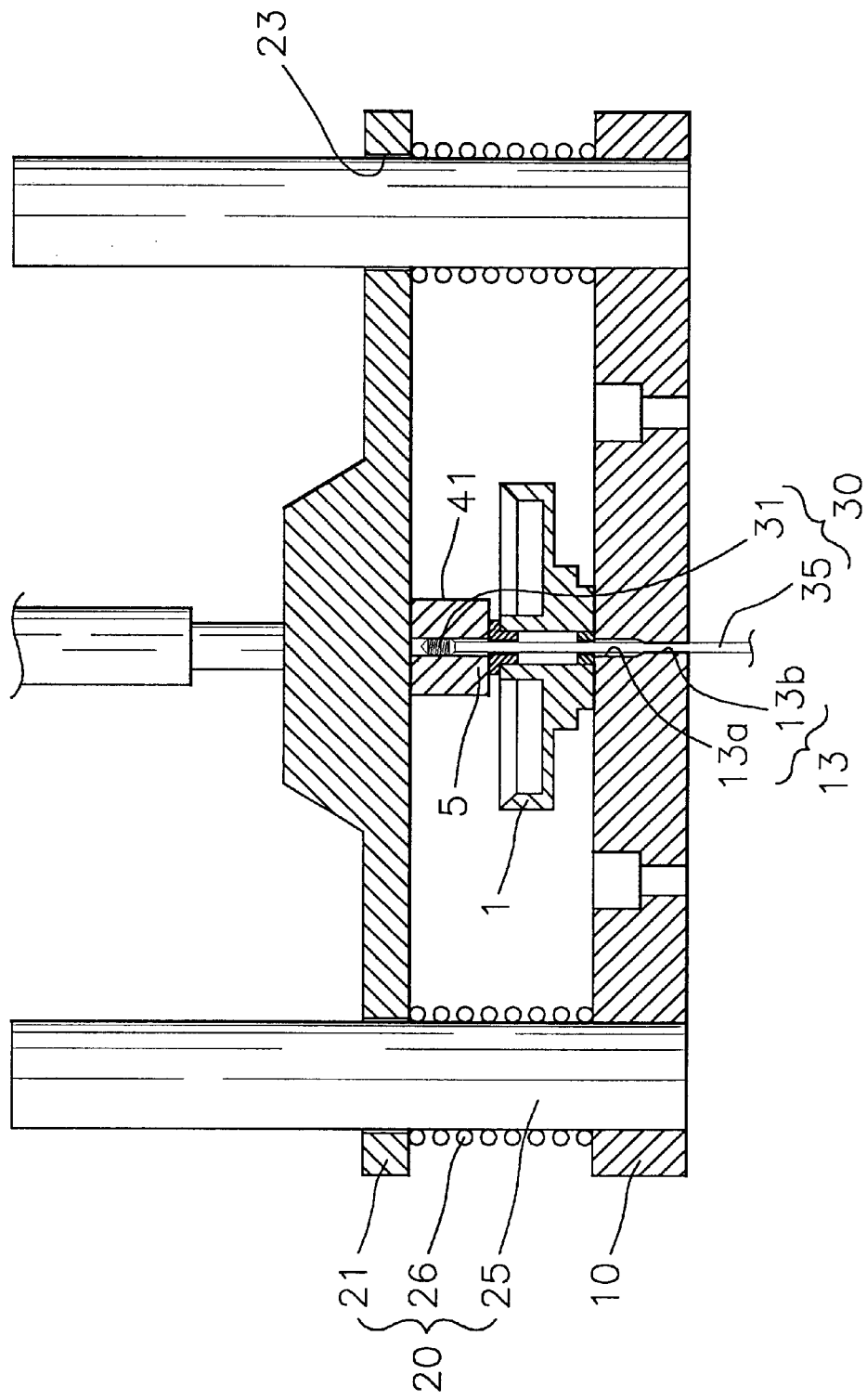
FIG. 7 offers a cross sectional view of the preferred embodiment shown in FIG. 5, illustrating the fitting of the bearings into the stationary drum.

Referring to FIG. 7, the workpiece and the rigid block 41 are mounted and aligned on the base die 10 and below the pressing element 21, using the aligning bar 35. When the pressing element 21 moves downward, the rigid block 41 presses the upper bearing 5 and the lower bearing 6 to thereby insert the upper and lower bearings 5,6 into the stationary drum 1. During the insertion process, the inner diameter of the bearings 5,6 becomes smaller than an outer diameter of the groove-forming element 31, as a result of the plastic compression.

Figure 8:
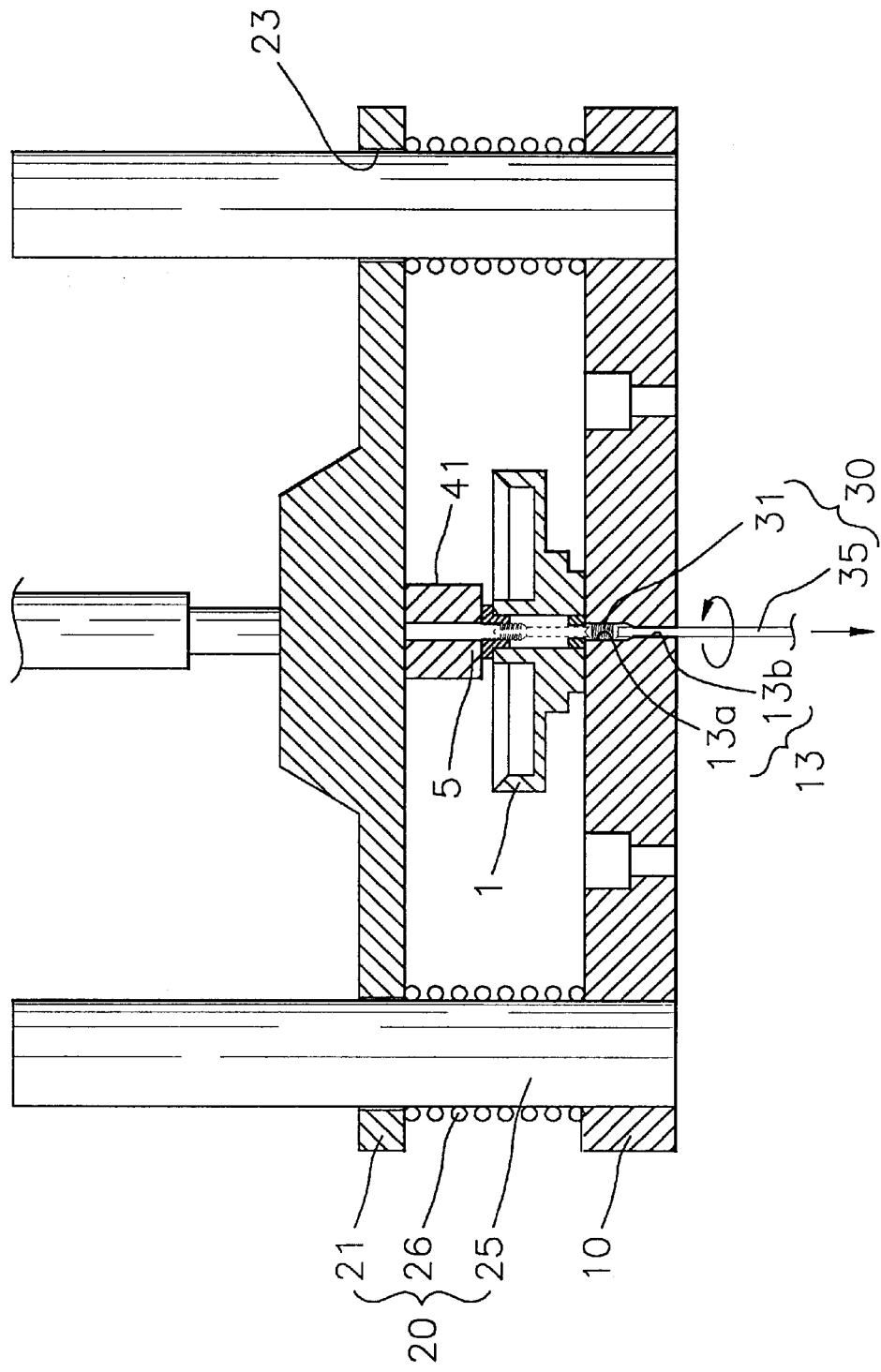
FIG. 8 depicts a cross sectional view of the preferred embodiment shown in FIG. 5, showing the forming of a groove in the bearing.

As shown in FIG. 8, when the groove-forming element 31 rotates and moves downward together with the aligning bar 35, the groove-forming element 31 cuts the helical-shaped groove on the inner peripheral surface of the inserted upper and lower bearings 5,6, segmentally. When the groove-forming element 31 enters the upper part 13a of the through hole 13, the pressing element 21 returns to its original position by the springs 26.

Although the invention has been shown and described with respect to the preferred embodiments, it will be understood by those skilled in the art that various changes and modifications may be made without departing from the spirit and scope of the invention as defined in the following claims.

What is claimed is:

1. An apparatus for forming an helical-shaped groove on a bearing in a head drum assembly and fitting the same into a stationary drum of the head drum assembly, the apparatus comprising:

a base die having a through hole on which the stationary drum and the bearing are mounted;

pressing means for pressing the bearing, so as to fit the bearing into the stationary drum;

groove-forming means for forming the helical-shaped groove on an inner peripheral surface of the bearing, the groove-forming means including
        (a) a groove-forming element having a cutting member for cutting the helical-shaped groove; and
        (b) an aligning bar extending from one end of the groove-forming element and movably fitted into the through hole of the base die, the bar being used to rotate and vertically move the groove-forming element simultaneously, the aligning bar passing through the stationary drum and the bearing mounted on the base die in turn so that the stationary drum and the bearing are aligned; and means for protecting the groove-forming element protruded above the bearing, while the pressing element presses the bearing.

2. The apparatus of claim 1, wherein the pressing means includes a plurality of columns vertically fixed to the base die and a pressing element engaged with the columns in such a way that the pressing element moves up and down along the columns.

3. The apparatus of claim 2, wherein the pressing means further includes resilient means for restoring the pressing element to an original position after the pressing operation of the pressing element is completed.

4. The apparatus of claim 3, wherein the resilient means are a plurality of springs disposed around the columns between the base die and the pressing element.

5. The apparatus of claim 1, wherein the groove-forming element has a circular shape and the cutting member is a cutting groove formed on a peripheral surface thereof, the cutting groove having a shape matched against the helical-shaped groove.

6. The apparatus of claim 5, wherein the groove-forming element has a slightly smaller diameter before the bearing is fitted onto the stationary drum, but a slightly larger diameter after the bearing is fitted onto the stationary drum, than an inner diameter of the bearing.

7. The apparatus of claim 6, wherein a diameter of the groove-forming element is larger than that of the aligning bar by $1/1000$ to $1/300$ of the diameter of the aligning bar.

8. The apparatus of claim 1, wherein the through hole of the base die includes a part for housing the groove-forming element after the groove forming operation is completed.

9. The apparatus of claim 1, wherein the protecting means includes a rigid block having a hole for receiving the groove-forming element.

\* \* \* \* \*